United States Patent [19]

Keeney

[11] 4,371,443

[45] Feb. 1, 1983

[54] METHOD OF AND COMPOSITION FOR ACIDIZING SUBTERRANEAN FORMATIONS

[75] Inventor: Bill R. Keeney, Duncan, Okla.

[73] Assignee: Halliburton Company, Duncan, Okla.

[21] Appl. No.: 232,785

[22] Filed: Feb. 9, 1981

[51] Int. Cl.$^3$ .............................................. E21B 43/27
[52] U.S. Cl. ................................ 252/8.55 C; 166/300
[58] Field of Search ................... 252/8.55 C; 166/300, 166/307

[56] References Cited

U.S. PATENT DOCUMENTS

| | | | |
|---|---|---|---|
| 2,652,360 | 9/1953 | Bond et al. ........................... | 252/8.55 |
| 2,778,427 | 1/1957 | Cardwell et al. ............... | 252/8.55 X |
| 2,824,833 | 2/1958 | Cardwell et al. ................... | 252/8.55 |
| 3,157,232 | 11/1964 | Ramos et al. .................... | 166/307 X |
| 3,707,192 | 12/1972 | Goins et al. ..................... | 166/307 X |
| 3,889,753 | 6/1975 | Richardson ..................... | 252/8.55 X |
| 4,044,833 | 8/1977 | Volz ..................................... | 166/307 |
| 4,172,041 | 10/1979 | Clampitt et al. ................... | 252/8.55 |

*Primary Examiner*—Herbert B. Guynn
*Attorney, Agent, or Firm*—Robert A. Kent; Thomas R. Weaver

[57] ABSTRACT

A method and composition for acid treating a subterranean formation. The composition comprises an aldehyde, an ammonium salt capable of reacting with the aldehyde to produce a free acid, and a chemical additive which retards the formation of the free acid. The process is carried out by contacting the subterranean formation with the composition.

14 Claims, No Drawings

METHOD OF AND COMPOSITION FOR ACIDIZING SUBTERRANEAN FORMATIONS

This invention relates to acid treating or acidizing of subterranean formations.

The flow of oil from a subterranean formation to a well bore depends, among other factors, upon the degree of permeability of the formation. Often, the permeability is not sufficiently great to prevent a desired rate of flow of fluids, e.g., crude oil, natural gas, and so forth, from the formation. In such a case, the formation can be treated to increase its permeability.

Acidizing fluids have been utilized heretofore for carrying out treatments in subterranean oil, gas or water producing formations. Such acidizing fluids have primarily been utilized to increase the productivity of oil and gas from calcareous formations by bringing out the removal of reactive materials from naturally occurring fractures and pore spaces in the formations whereby the sizes thereof are increased. Hydrochloric acid is ordinarily used in acidizing limestone or dolomite formations and mixtures of hydrochloric and hydrofluoric acid are ordinarily used in acidizing sandstone formations.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the in-situ stresses. This results in creating a crack or fracture in the formation to provide a passageway which facilitates flow of fluids through the formation and into the well. Combination fracture-acidizing processes are well known in the art.

The rate at which acidizing fluids react with reactive materials in a formation is a function of various factors including acid concentration, temperature, velocity, the type of reactive material encountered, etc.. Whatever the rate of reaction, the acidizing fluid can be introduced into the formation only a certain distance before it becomes spent. The time required for the acidizing fluid to become spent is referred to herein as "reaction time". In creating new fractures in a formation, if the acidizing fluid is pumped further into the formation after it has become spent, it may extend fractures in the formation, but it may not increase the flow capacities of the extended fractures which may close completely when pressure is relieved. Thus, it is important to extend the "reaction time" of acidizing fluids so that reactive materials are removed and/or new fractures are etched for as great a distance into the formation from the well bore as possible.

Another problem associated with acidizing subterranean formations is the corrosion by the acid of the equipment which are used to carry out the treatment. The acid also presents a corrosive problem to the tanks used to transport the acid to and from the well bore and, on location, the acid has a tendency to attack to pumps, metal tubing leading to and within the casing along with oil well tools and connecting lines. The expense of repairing or replacing these corrosion damaged parts is extremely high.

Still another problem encountered in acidizing operations is the high temperatures encountered in formations with deep wells. Because of the quick "reaction time" of the acids at high temperatures existing in the formations with deep wells, the acid is largely neutralized by the reactive material immediately adjacent to the well bore before the acid can reach other desired portions of the formation. The high temperatures existing in these formations also increase the corrosion by the acid of the casing and tubing of the well.

Various solutions have been proposed to increase the reaction time of various acidizing solutions on acidizable formations and to decrease the corrosion problem related to the acidizing solutions. For example, in U.S. Pat. No. 3,157,232, which is assigned to the assignee of the present invention and is herein incorporated by reference, a method of acidizing an oil-bearing earthen formation to increase productivity thereof is disclosed. The method comprises combining formaldehyde and an ammonium salt capable of reacting with the formaldehyde to form a free acid and directing the free acid through the oil-bearing earthen formation. In U.S. Pat. No. 3,707,192, a slurry of reactive particles is displaced down a well and into a fracture to coat the faces of the fracture at the desired radial distance from the well. Next, a non-acidic fluid reactant that will react with the reactant particles to form an acid capable of dissolving constituents of the formation is then injected into the fracture.

Although the acidizing compositions of U.S. Pat. Nos. 3,707,191 and 3,157,232 are useful in stimulating wells, certain problems have remained. For instance, when the reactants are mixed on the surface, the acid is immediately produced causing corrosion and a short "reaction time". When the reactants are injected separately into the fracture, there is often difficulty in mixing the two fluids in the fracture, particularly when one of the fluids is much more viscous than the other.

The present invention provides a composition and method for acid treating a subterranean formation which overcomes or at least mitigates the above described problems.

It has been discovered that the addition of various chemical additives such as formic acid, or acetic acid or the alkali metal or ammonium salt of formic acid or acetic acid, or hexamethylenetetramine (HMTA) will slow the rate of formation of a free acid when an aldehyde reacts with an ammonium salt and therefore results in delayed production of the acid which allows the acid to penetrate deeper into the formation and releases more of the desired products.

In accordance with the concept of the invention, there is provided a composition comprising a chemical additive, an aldehyde, and an ammonium salt capable of reacting with the aldehyde to produce a free acid. Optionally, a thickening or gelling agent can be added to the above described composition. Suitable chemical additives that may be employed to carry out the invention are low molecular weight organic acids such as acetic acid or formic acid, the alkali metal and the ammonium salts of the low molecular weight organic acids, hexamethylenetetramine (HMTA) and mixtures thereof. The preferred composition is acetic acid.

Suitable aldehydes that may be used are formaldehyde, acetaldehyde, propionaldehyde, glyoxal and butoxyaldehyde. Polymeric forms of formaldehyde such as trioxine or paraformaldehyde can also be used as well as the monomer. Because of the effectiveness of the reaction products in dissolving the subterranean formation and the cost and availability of the reactants, the preferred aldehyde is formaldehyde.

The ammonium salts that can be used to carry out the present invention are generally any ammonium salt that reacts with aldehyde to form a free acid. For example, ammonium chloride will yield hydrochloric acid, ammonium fluoride or ammonium bifluoride will yield hydrofluoric acid, ammonium citrate will yield citric acid, ammonium formate will yield formic acid, ammonium nitrate will yield nitric acid, ammonium sulfate will yield sulfuric acid, ammonium carbonate will yield carbonic acid, etc.. The list could be extended to include any acid where ammonium salt reacts with the aldehyde to form the free acid.

The present invention involves a known reaction between an ammonium salt and an aldehyde. It has long been known that the reaction of formaldehyde and ammonium salt produces a free acid. (see Formaldehyde, Second Edition, J. Frederick Walker, 1953). The reaction can be represented as follows:

$$6CH_2O + 4NH_4F \rightarrow C_6H_{12}N_4 + 4HF + 6H_2O$$

$$6CH_2O + 4NH_4Cl \rightarrow C_6H_{12}N_4 + 4HCl + 6H_2O$$

The different acids, hydrochloric acid and hydrofluoric acid are the condensation products of the foregoing reactions and they vary depending solely on the substitution of different ammonium salts.

Generally, the amount of free acid generated to treat the formation and produced in the above described reaction can vary depending upon the type of formation being treated, and the results desired in the particular treating operation. The amount generated can vary from less than 1 to greater than 60 weight percent based on the total weight of the acidic composition of the invention. When the free acid generated is hydrochloric acid, it is most preferred to generate an amount of hydrochloric acid within the range of 1 to about 15 weight percent based on the total weight of the acid composition.

In certain acid treating operations carried out with an acid composition, it is preferred that the viscosity of the solution be kept at a minimum in order to facilitate the penetration of acid into the pores of the treated formation. In certain other applications such as fracturing of the formation, a composition of higher viscosity may be desired. In those instances, a gelling or thickening agent may be incorporated into the acid composition. Generally, any conventional gelling or thickening agent may be employed in accordance with the present invention. Examples of suitable gelling or thickening agents are galactomannans such as guar gum, gum karaya, gum tragacanth, gum ghatti, gum acacia, gum konjak, shariz, locus, psyllium, tamarind, gum tara, carrageenin, gum kauri, modified guars such as hydroxypropyl guar, hydroxyethyl guar, carboxymethyl hydroxyethyl guar, carboxymethyl hydroxypropyl guar, cellulose ethers such as carboxyethyl cellulose, carboxymethyl cellulose (CMC), carboxymethyl hydroxyethyl cellulose (CMHEC), hydroxyethyl cellulose, hydroxypropyl cellulose, methylhydroxypropyl cellulose, methyl cellulose, ethyl cellulose, propyl cellulose, and hydroxypropylmethyl cellulose, polyacrylamides, polyacrylates, oils which contain emulsifying agents such as diesel oil, kerosine, or crude oil and polysaccharides.

The amount of thickening or gelling agent used in the acidic composition of the invention can vary widely depending upon the viscosity, grade, and purity of the gelling agent and the properties desired in said composition. In general, the amount of thickening or gelling agent used will be in the range of from about 0.01 to about 5 percent by weight. Small amounts of the gelling agent will produce liquid mobile gels which can be readily pumped whereas large amounts of the gelling agent will produce more viscous gels. There is, however, really no limit on the amount of gelling or thickening agent which can be used as long as the gelled acidic composition can be pumped in accordance with the methods of the invention.

Other materials may be included in the composition of the invention. For instance, various treating agents such as acid corrosion inhibitors, mutual solvents, anti-sludging agents and friction reducing agents may be added to the acid composition of the invention.

When it is more desirable to contact the subterranean formation with a foam containing the acidic composition of the present invention, any foaming agent compatible with the composition of the invention and capable of producing foam in an acidic environment may be used. Many of these foaming agents are disclosed in U.S. Pat. No. 4,044,833.

The method of the invention is carried out first by adding the aldehyde to the chemical additive used to slow the formation of the free acid and then mixing the ammonium salt with the aldehyde chemical additive mixture. The amount of chemical additive utilized in the invention can vary widely. Generally speaking, amounts in the range of from about 1 to about 20 percent by weight of the acid composition can be used but amounts outside said range can also be used depending upon the "reaction time" desired in the acidic composition. Preferably, for economic reasons, the aldehyde and ammonium salt are mixed together in stoichiometric equivalent amounts. If a composition is desired with a viscosity greater than the above described mixture, the gelling or thickening agent is added to the composition in amounts sufficient to achieve the viscosity desired.

The acid compositions of the invention can be prepared on the surface in a suitable tank equipped with suitable mixing means, e.g., a rotating, motor-driven, truck-mounted, cylindrical or oval shaped mixer, which is adapted for convenient removal of contents thereof as by tipping, pumping, or application of gas pressure. The composition may be either transferred at a controlled rate directly down the well bore or it may be removed to a convenient storage tank for injection down the well bore.

The composition is next introduced into the subterranean formation. The acid is introduced into the subterranean formation whereby the calcareous rock in the formation is dissolved thereby increasing the permeability, and permitting better flow of fluids through the formation. The pumping rate and pressures utilized will obviously depend upon the characteristics of the formation and whether fracturing of the formation is desired. After the acid composition has been injected in this manner, the well may be shut in and allowed to stand for a period of several hours or more depending on the composition and characteristics of the formation and the type of treatment being performed. If there is pressure on the well, pressure is then released and the spent acid composition containing salts formed by the reaction of the acid composition, is permitted to flow back into the well bore and is pumped or flowed to the surface. The well may therefore be placed on production or used for other purposes.

It is within the scope of the invention to proceed the injection of the acidic composition into the formation with a preflush liquid. For instance, the injection of a cooling fluid, such as water, serves to cool the well tubing and formation and extend the useful operating temperature range of the acidic compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

The following example will serve to more comprehensively illustrate the principals of the invention but is not intended to limit the bounds of the invention.

EXAMPLE I

Laboratory tests were performed on silicon dioxide using the acidic composition of the invention. The chemical additives used to slow the rate of formation of the acid were acetic acid and the ammonium salt of acetic acid.

Samples 1, 2 and 3 were 25 cc. aqueous compositions containing 2.35 g. of ammonium fluoride and 2.86 g. of formaldehyde.

Samples 4, 5 and 6 were 25 cc. aqueous compositions containing 2.35 g. of ammonium fluoride, 2.86 g. of formaldehyde and 1.23 g of ammonium acetate.

Samples 7, 8 and 9 were 25 cc. aqueous compositions containing 2.35 g. of ammonium fluoride, 2.86 g. of formaldehyde and 3.68 g. of ammonium acetate.

Samples 10, 11 and 12 were 25 cc. aqueous compositions containing 2.35 g. of ammonium fluoride, 2.86 g. of formaldehyde and 4.90 g. of ammonium acetate.

Sample 13 was a 25 cc. aqueous composition containing 2.35 g. of ammonium fluoride, 2.86 g. of formaldehyde and acetic acid, 15% by weight of the aqueous composition.

After the components of each sample were prepared, 4 grams of 8 to 12 mesh silicon dioxide beads were placed in each sample. The samples were reacted with the silicon dioxide beads at 70° F. with constant shaking. The samples were analyzed for silicon dioxide content by atomic adsorption. The amount of spent acid was determined from the amount of silicon dioxide dissolved by the sample. The results of these tests are shown in Table I.

TABLE I

Reaction Rate Comparison

| Sample | Composition | Reaction Time Minutes | Acid Spent % by Weight | Acid Live % by Weight |
|---|---|---|---|---|
| 1 | $NH_4F$ HCHO | 30 | 66.4 | 33.6 |
| 2 | $NH_4F$ HCHO | 60 | 70 | 30.0 |
| 3 | $NH_4F$ HCHO | 120 | 72 | 28.0 |
| 4 | $NH_4F$ HCHO $CH_3COONH_4$ | 30 | 56 | 44.0 |
| 5 | $NH_4F$ HCHO $CH_3COONH_4$ | 60 | 62 | 38 |
| 6 | $NH_4F$ HCHO $CH_3COONH_4$ | 120 | 63.2 | 36.8 |
| 7 | $NH_4F$ HCHO | 30 | 46.8 | 53.2 |
| 8 | $CH_3COONH_4$ $NH_4F$ HCHO | 60 | 54.4 | 45.6 |
| 9 | $CH_3COONH_4$ $NH_4F$ HCHO | 120 | 54.8 | 45.2 |
| 10 | $CH_3COONH_4$ $NH_4F$ HCHO | 30 | 40 | 60 |
| 11 | $CH_3COONH_4$ $NH_3F$ HCHO | 60 | 57.6 | 42.4 |
| 12 | $CH_3COONH_4$ $NH_4F$ HCHO | 120 | 61.6 | 38.4 |
| 13 | $CH_3COONH_4$ $NH_4F$ HCHO $CH_3COOH$ | 30 | 52 | 48 |

Based on the data of Table I, it can be clearly seen that samples 4 through 12 containing ammonium acetate and sample 13 containing acetic acid reacted slower on silicon dioxide than samples 1 through 3 which do not contain acetic acid or ammonium acetate.

EXAMPLE II

Laboratory tests were performed on silicon dioxide using the acidic composition of the invention. The chemical additive used to delay the rate of formation of the acid was hexamethylenetetramine (HMTA).

Sample 1 was a 25 cc. aqueous composition containing 2.35 g. of ammonium fluoride and 2.86 g. of formaldehyde.

Sample 2 was a 25 cc. aqueous composition containing 2.35 g. of ammonium fluoride, 2.86 g. of formaldehyde and 1.83 g. of hexamethylenetetramine (HMTA).

Sample 3 was a 25 cc. aqueous composition containing 2.35 g. of ammonium fluoride, 2.86 g. of formaldehyde and 3.66 g. of hexamethylenetetramine (HMTA).

Sample 4 was a 25 cc. aqueous composition containing 2.35 g. of ammonium fluoride, 2.86 g. of formaldehyde and 5.49 g. of hexamethylenetetramine (HMTA).

After the components of each sample were prepared, 4 grams of 8 to 12 mesh silicon dioxide beads were placed in each sample. The samples were reacted with the silicon dioxide beads at 70° F. with constant shaking. The samples were analyzed for silicon dioxide content by atomic adsorption. The amount of spent acid was determined from the amount of silicon dioxide dissolved by the sample. The results of these tests are shown in Table II.

TABLE II

Reaction Rate Composition

| Sample | Composition | Reaction Time Minutes | Acid Spent % by Weight | Acid Live % by Weight |
|---|---|---|---|---|
| 1 | $NH_4F$ HCHO | 30 | 66.4 | 33.6 |
| 2 | $NH_4F$ HCHO HMTA | 30 | 63 | 37 |
| 3 | $NH_4F$ HCHO HMTA | 30 | 47.2 | 52.8 |
| 4 | $NH_4F$ HCHO | 30 | 33.2 | 66.8 |

TABLE II-continued

| Sample | Composition | Reaction Rate Composition | | |
|---|---|---|---|---|
| | | Reaction Time Minutes | Acid Spent % by Weight | Acid Live % by Weight |
| | HMTA | | | |

Based on the data of Table II, it is clear that samples 2, 3 and 4, which contained various amounts of hexamethylenetetramine (HMTA), reacted slower than sample 1 which contained no HMTA and the degree of retardation increased with increasing amounts of HMTA.

EXAMPLE III

Laboratory tests were performed on silicon dioxide using the acidic composition of the invention. The chemical additive used to delay the rate of formation of the acid was various mixtures of hexamethylenetetramine (HMTA) and ammonium acetate.

Sample 1 was a 25 cc. aqueous composition containing 2.35 g. of ammonium fluoride and 2.86 g. of formaldehyde.

Sample 2 was a 25 cc. aqueous composition containing 2.35 g. of ammonium fluoride, 2.86 g. of formaldehyde, 1.83 g. of hexamethylenetetramine (HMTA) and 2.46 g. of ammonium acetate.

Sample 3 was a 25 cc. aqueous composition containing 2.35 g. of ammonium fluoride, 2.86 g. of formaldehyde, 3.66 g. of hexamethylenetetramine (HMTA) and 1.23 g. of ammonium acetate.

Sample 4 was a 25 cc. aqueous composition containing 2.35 g. of ammonium fluoride, 2.86 g. of formaldehyde, 3.66 g. of hexamethylenetetramine (HMTA) and 2.46 g. of ammonium acetate.

After the components of each sample were prepared, 4 grams of 8 to 12 mesh silicon dioxide beads were placed in each sample. The samples were reacted with the silicon dioxide beads at 70° F. with constant shaking. The samples were analyzed for silicon dioxide content by atomic adsorption. The amount of spent acid was determined from the amount of silicon dioxide dissolved by the sample. The results of these tests are shown in Table III.

TABLE III

| Sample | Composition | Reaction Rate Comparison | | |
|---|---|---|---|---|
| | | Reaction Time Minutes | Acid Spent % by Weight | Acid Live % by Weight |
| 1 | $NH_4F$ HCHO | 30 | 66.4 | 33.6 |
| 2 | $NH_4F$ HCHO HMTA $CH_3COONH_4$ | 30 | 45.6 | 54.4 |
| 3 | $NH_4F$ HCHO HMTA $CH_3COONH_4$ | 30 | 49.6 | 50.4 |
| 4 | $NH_4F$ HCHO HMTA $CH_3COONH_4$ | 30 | 41.6 | 58.6 |

Based on the data of Table III, it is clear that samples 2, 3 and 4, which contained hexamethylenetetramine (HMTA) and ammonium acetate reacted slower than sample 1 which contained neither chemical additive and the degree of retardation can be varied, depending upon the relative proportions of HMTA and ammonium acetate present in the acidic composition.

This invention is not limited to the above described specific embodiments thereof; it must be understood, therefore, that the detail involved in the descriptions of the specific embodiments is presented for the purpose of illustration only, and that reasonable variations in modifications, which will be apparent to those skilled in the art, can be made in this invention without departing from the spirit and the scope thereof.

I claim:

1. An acidic composition comprising:
   (a) an aldehyde selected from the group consisting of formaldehyde, acetaldehyde, propionaldehyde, glyoxal, butoxyaldehyde, trioxine, and paraformaldehyde;
   (b) an ammonium salt selected from the group consisting of ammonium fluoride, ammonium bifluoride, ammonium chloride, ammonium sulfate and ammonium nitrate present in an amount sufficient to react with said aldehyde to form an acid; and
   (c) a chemical additive selected from the group consisting of acetic acid, an alkali metal salt of said acetic acid, an ammonium salt of said acetic acid, formic acid, an alkali metal salt of formic acid, an ammonium salt of said formic acid, mixtures thereof and mixtures with hexamethylenetetramine, said additive being and present in an amount sufficient to retard said reaction of said aldehyde to form said acid.

2. The acidic composition recited in claim 1 further comprising a gelling agent.

3. The acidic composition recited in claim 2 wherein said gelling agent is selected from the group consisting of polyacrylamides, oils, polysaccharides, polyacrylates, gum karaya, carboxyethyl cellulose, carboxymethyl hydroxyethyl cellulose, hydroxyethyl cellulose, hydroxypropyl cellulose, methylhydroxypropyl cellulose, methyl cellulose, ethyl cellulose, propyl cellulose and hydroxypropylmethyl cellulose.

4. The acidic composition recited in claim 2 wherein said gelling agent is selected from the group consisting of gum tragacanth, gum ghatti, gum acacia, gum konjak, shariz, locus, psyllium, tamarind, gum tara, carrageenin, gum kauri, hydroxypropyl guar, hydroxyethyl guar, carboxymethyl hydroxypropyl guar and carboxymethyl hydroxyethyl guar.

5. The acid composition recited in claims 1 or 2 wherein said ammonium salt capable of reacting with said aldehyde to form said acid is selected from the group consisting of ammonium chloride and ammonium fluoride.

6. The acidizing composition recited in claims 3 or 4 further comprising a friction reducing agent.

7. The acidic composition recited in claims 1 or 2 wherein said acidic composition is foamed.

8. A method of acid treating a subterranean formation comprising:
   (a) contacting said formation with an acidic composition comprising:
   an aldehyde selected from the group consisting of formaldehyde, acetaldehyde, propionaldehyde, glyoxal, butoxyaldehyde, trioxine, and paraformaldehyde;
   an ammonium salt selected from the group consisting of ammonium fluoride, ammonium bifluoride, ammonium chloride, ammonium sulfate and ammonium nitrate present in an amount sufficient to react with said aldehyde to form a free acid; and a chemical additive selected from the group consisting of acetic acid, an alkali metal salt of acetic acid, an ammonium salt of acetic acid, formic acid, an alkali metal salt of formic acid, an ammonium salt of formic acid, mixtures thereof, and mixtures with hexamethylenetetramine, said additive being present in an amount sufficient to retard reaction of said aldehyde to form said free acid; and (b) withdrawing said composition from said formation.

9. The method recited in claim 8 wherein said acid composition further comprises a gelling agent.

10. The method recited in claim 9 wherein said gelling agent is selected from the group consisting of polyacrylamides, polysaccharides, oils, polyacrylates, gum karaya, carboxyethyl cellulose, carboxymethyl hydroxyethyl cellulose, hydroxyethyl cellulose, hydroxypropyl cellulose, methylhydroxypropyl cellulose, methyl cellulose, ethyl cellulose, propyl cellulose and hydroxypropylmethyl cellulose.

11. The method recited in claim 9 wherein said gelling agent is selected from the group consisting of gum tragacanth, gum ghatti, gum acacia, gum konjak, shariz, locus, psyllium, tamarind, gum tara, carrageenin, gum kauri, hydroxypropyl guar, hydroxyethyl guar, carboxymethyl hydroxypropyl guar and carboxymethyl hydroxyethyl guar.

12. The method recited in claims 8 or 9 wherein said ammonium salt capable of reacting with said aldehyde to form said free acid is selected from the group consisting of ammonium fluoride and ammonium chloride.

13. The method recited in claims 8 or 9 further comprising incorporating a friction reducing agent into said acidic composition.

14. The method recited in claims 8 and 9 wherein said acidic composition is foamed.

* * * * *

UNITED STATES PATENT AND TRADEMARK OFFICE
CERTIFICATE OF CORRECTION

PATENT NO. : 4,371,443
DATED : February 1, 1983
INVENTOR(S) : Bill R. Keeney

It is certified that error appears in the above—identified patent and that said Letters Patent are hereby corrected as shown below:

In Column 6, Table I, Sample 11 should read:

| Sample | Composition | Reaction Time (Minutes) | Acid Spent % by Weight | Acid Live % by Weight |
|--------|-------------|-------------------------|------------------------|-----------------------|
| 11 | $NH_4F$ $HCHO$ $CH_3COONH_4$ | 60 | 57.6 | 42.4 |

Signed and Sealed this

Twelfth Day of April 1983

[SEAL]

Attest:

GERALD J. MOSSINGHOFF

Attesting Officer

Commissioner of Patents and Trademarks